Oct. 15, 1940.  B. R. HERMANN  2,218,397

ELECTRIC LINE TAPPING APPARATUS

Original Filed Jan. 3, 1938

Inventor:
Benjamin R. Hermann,
by Harry E. Dunham
His Attorney.

Patented Oct. 15, 1940

2,218,397

UNITED STATES PATENT OFFICE 2,218,397

ELECTRIC LINE TAPPING APPARATUS

Benjamin R. Hermann, Lanesborough, Mass., assignor to General Electric Company, a corporation of New York Original application January 3, 1938, Serial No. 183,046. Divided and this application June 24, 1939, Serial No. 281,009

1 Claim. (Cl. 200—115.5)

The present invention relates to line tapping apparatus for the making of more or less temporary electric connection to overhead line conductors and the like.

Line tapping devices, or line tappers, usually are provided with some means adapted to be engaged by a maintenance pole for manipulation of the line tapper to and from a connected position on an overhead electric conductor. In case such line tapper is employed for installation of an expulsion type electric device, such as a fuse cutout or lightning arrester including an expulsion tube, and the line tapper is manipulated to connected position during occurrence of a short-circuit, lightning discharge, or other condition which may cause operation of the electric device, the danger arises that a lineman handling the maintenance pole may be injured by discharge of gases or solid particles from the expulsion tube.

To avoid the danger referred to, it is an object of the present invention to provide a line tapper having an improved construction and arrangement of parts such as to insure that an expulsion device carried thereby can not discharge in a direction to injure a lineman while he is manipulating the line tapper to a connected position on an overhead conductor.

Other objects and the details of that which I believe to be novel and my present invention will become apparent from the following description and the claim appended thereto, taken in conjunction with the accompanying drawing in which the invention is illustrated, by way of example, as embodied in a line tapper of the improved form disclosed in my application Serial No. 183,046, filed January 3, 1938, and assigned to the same assignee as the present invention, of which said application the present application constitutes a division.

Figure 1:
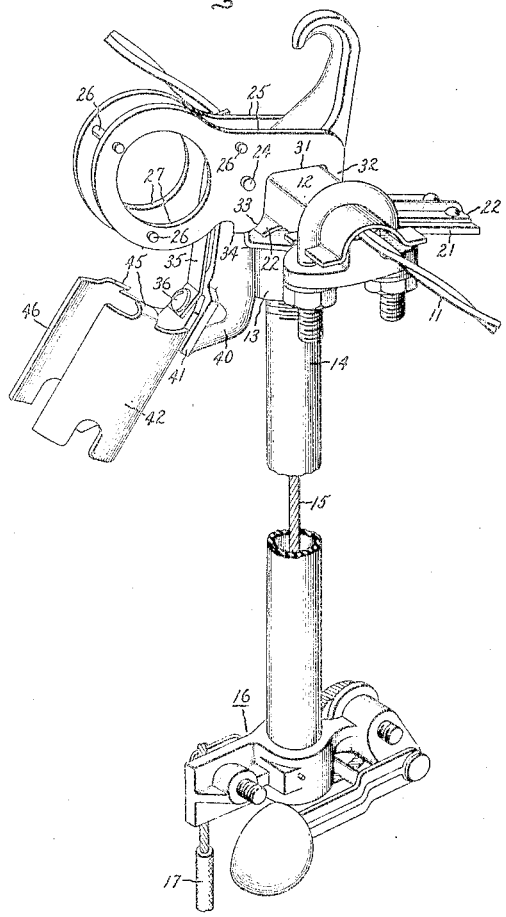
Figure 2:
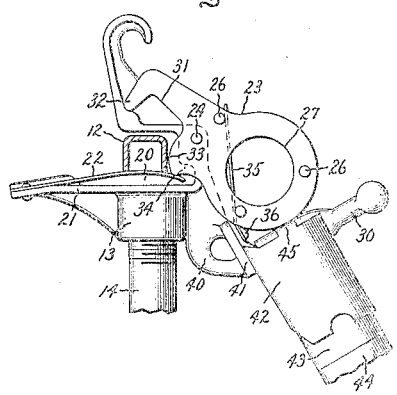
Figure 3:
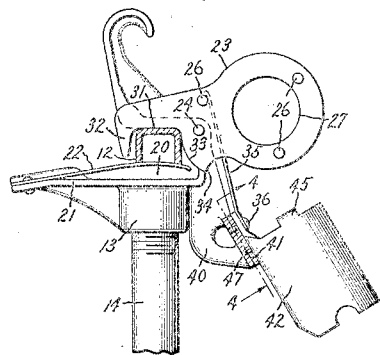
Figure 4:
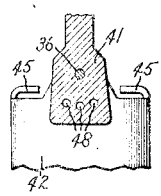

In the drawing, Fig. 1 shows my improved line tapper as employed for the installation of an expulsion fuse cutout on an overhead electric line, it being understood, however, that this line tapper may be employed also for the installation of other forms of electric devices, such as expulsion tube lightning arresters; Figs. 2 and 3 are detail views showing steps in the installation of the line tapper on a line conductor, and Fig. 4 illustrates, partially in section along the line 4—4 of Fig. 3, a structural detail of the line tapper.

Referring to the drawing, 11 designates a portion of a line conductor. A metallic saddle 12, of the improved form disclosed in my application previously referred to, is mounted on the line conductor to serve as a guard therefor. No detailed description of the construction and manner of mounting of this saddle is given herein since it is not essential to an understanding of the present invention. However, sufficient of the details of the illustrated line tapping device, more fully described in my previously referred to application, will be given to insure a proper understanding of the present invention. The main body portion 13 of this device is formed with a tubular socket for receiving the screw-threaded upper end of an expulsion tube, indicated at 14, designed for discharge of gases from the lower end. This expulsion tube may form part of a lightning arrester, or, as in the illustrated embodiment, may form part of a fuse cutout having a fuse link, partially shown at 15. Any suitable form of fuse terminal means (not shown) may be employed for electrically connecting the upper end of fuse link 15 with body 13. The lower end of tube 14 is provided with a combined terminal and indicating device, inclusively designated 16, to which the lower end of the fuse link is connected and which is of the form disclosed in my U. S. Letters Patent No. 2,128,145; issued August 23, 1938, and assigned to the assignee of the present invention. However, other forms of lower terminal means may be employed if desired. 17 designates a connection lead, such as that extending from a transformer, which is clamped to terminal device 16.

The body portion 13 of the line tapper is formed with a generally rectangular recess 20 which is open at the front to allow passage of saddle 12 thereinto, and the bottom wall of this recess has a forwardly extending projection 21 to guide the saddle into the recess. Secured at its outer end to the outer end of projection 21 is a metallic spring strip 22, the free end of which strip projects into and is vertically movable in recess 20. This spring strip has, among others, the important functions of frictionally holding the saddle in the recess and of pressing upwardly on the saddle to maintain the latter firmly in electrically conductive contact with the top wall of the recess, as best shown in Fig. 3. In order to insure positive retention of saddle 12 in recess 20, there is provided a latching element 23 which is fulcrumed on a pivot 24 carried by element 13. Latching element 23 is comprised of two plate members 25, secured rigidly in spaced apart relationship by spacing members 26 and disposed respectively on opposite sides of element 13. Members 25 have alined operating eyelets 27 disposed to the rear of pivot 24, and have alined recesses 31 on the other side of pivot 24 from eyelets 27. Recesses 31 are of approximately rectangular shape to conform to the shape of saddle 12. The portions of members 25 which define the front walls of recesses 31 comprise downwardly projecting, rounded-ended latching fingers 32 arranged to project over the open front of recess 20 when latching element 23 is in its closed position illustrated in Figs. 1 and 3. The rear walls of recesses 31 are in the form of cam surfaces 33 which curve downwardly and backwardly to cam or detent portions 34. Cam surfaces 33 are arranged so that they project forwardly of the rear wall of recess 20 when latching element 23 is in its open position illustrated in Fig. 2, thereby to serve as trip means for engagement by saddle 12 in a manner to be described. A leaf spring 35, secured at its lower end by means of screw 36, is arranged so that its upper free end presses against one of the spacing members 26 to exert a force tending to rotate latching element 23 forward, or in a counterclockwise direction as viewed in Fig. 2.

Extending outwardly and downwardly from the back of body 13 is an arm 40 which serves to support the lower end of spring strip 35, and which has a connection plate 41 extending transversely of the arm and obliquely outwardly relative to the vertical axis of body portion 13, as best shown in Figs. 2 and 3. The upper end of a tubular socket element 42 is swivelly attached to plate 41 by means of screw 36. This socket element is designed to receive therein, and relatively rigidly to engage, the head 43 of an insulating maintenance pole, such as a common form of switch hook partially indicated at 44, having a hook projection 30. At the upper end of the socket element are inwardly projecting stops 45 arranged to engage the upper end of head 43 to limit upward sliding thereof in the socket element, and a longitudinal slot 46 is provided in the outer side of the socket element so that hook projection 30 may travel therein as the maintenance pole head is inserted in the socket element. The back of the socket element is provided with a pin 47 adapted to be received in one of the three openings 48, shown best in Fig. 4, in connection plate 41. If screw 36 is tightend up with pin 47 in the middle one of the openings 48, the socket element will be maintained in such position that its longitudinal axis lies substantially in the same plane with the vertical axis of body portion 13 and tube 14. By loosening screw 36, the socket element may be moved to the right or left to engage pin 47 with one or the other of the side openings 48 whereby, with screw 36 tightened up, the socket element is maintained in a position such that its longitudinal axis extends at an angle either to the right or to the left of a plane through the vertical axis of body portion 13 and tube 14. Thus, provision is made for selective positioning of the socket element relative to body 13 and an expulsion tube carried thereby. As a result of this expedient, the socket element may be positioned by a lineman so as to make it most convenient for manipulation of the line tapper in accordance with whatever conditions may be encountered in installation and servicing.

In preparation for installation of the line tapper on an overhead conductor, latching element 23 is rotated to its open position and the head of switch stick 44 is inserted into socket element 42, as shown in Fig. 2. With latching element 23 in open position, cam portions 34 engage the free end of spring strip 22 to hold the spring strip in its lowered position in recess 20, thereby providing for the ready reception of saddle 12 in the recess, the latching fingers 32 being raised out of closing relation to the front of the recess. The line tapping device then may be raised by means of pole 44 until projection 21 is brought into engagement with the underneath side of saddle 12, whereupon, with an upward and forward movement of the switch stick, the tapping device may be pushed onto the saddle until the rear side of the saddle engages cam surfaces 33. A slight pressure forces these cam surfaces backwardly with accompanying forward rotation of latching element 23 until the detent portions 34 of cam surfaces 33 become disengaged from the end of spring strip 22. Then the slightly downwardly curved end of the spring strip exerts on portions of cam surfaces 33 a force having a vector to the right of pivot 24, as viewed in Figs. 2 and 3, thereby producing further forward movement of the latching element to its closed position illustrated in Fig. 3. The final movement of the latching element to closed position is a snap action movement due to the resiliency of the spring strip and the sliding of the rounded end of the spring strip over cam surfaces 33. The snap action movement is aided also by the forward pressure of spring strip 35. As the end of spring strip 22 becomes disengaged from cam surfaces 33, the spring strip flexes upwardly to its position shown in Fig. 3 to effect firm electrically conductive engagement of the top of saddle 12 with the top wall of recess 20. Thus, saddle 12 is frictionally held in the recess by spring strip 22 and also is retained positively in the recess by latching fingers 32. The latching element is maintained in closed position by spring strip 35. Also, the end of spring strip 22, when raised, is in position to be engaged frictionally by cam surfaces 33 in such manner as to prevent accidental rotation of the latching element to open position. From the foregoing description it will be seen that installation of the line tapper on an overhead conductor may be effected by a simple upward and forward movement of a switch stick engaged with socket 42.

Removal of the line tapper from the line conductor may be effected by a single rapid movement of the switch stick in the opposite direction from that employed to effect engagement of the line tapper with the line conductor, thereby insuring quick extinction of any arc which may be drawn upon removal of the line tapper from the line conductor. For effecting such removal, hook projection 30 on the switch stick is engaged with eyelets 27 of latching element 23, and a single downward and backward pull on the switch stick serves to remove the line tapper from saddle 12. This downward and backward pull produces rotation of the latching element in a clockwise direction, as viewed in Fig. 3, about pivot 24, the force exerted on the latching element being sufficient to cause cam surfaces 33 to ride over the end of spring strip 22. Thus, latching fingers 32 are moved upwardly from closing position relative to the front of recess 20 while spring strip 22 is depressed by cam surfaces 33 and detent portions 34 so as to release saddle 12 for movement out of the recess. The latching element will be maintained in open position by spring strip 22, as previously pointed out.

An important feature of the construction herein described, resides in the fact that connection plate 41 slants outwardly obliquely and at a considerable angle relative to the vertical axis of body portion 13. As a result of this an expulsion tube, such as the one illustrated, will be supported so that its lower discharge end extends at a considerable divergent angle with respect to a switch stick or maintenance pole which is engaged with socket element 42 in the manner illustrated in Fig. 2. Thus, it is insured that the lower end of the expulsion tube will be directed away from a lineman holding the switch stick while manipulating the line tapper to a connected position on a line conductor. By reason of this important safety feature, the lineman is protected from injury due to gases discharged from the expulsion tube in case the line tapper is engaged with a line conductor under conditions which might cause operation of the expulsion device.

What I claim as new and desire to secure by Letters Patent of the United States, is:

In a line tapping apparatus, the combination with an electric device including an expulsion tube designed for discharge of gases from one end thereof, of a line tapping device including an electrically conductive element having a socket in which the other end of said tube is relatively rigidly secured for support of the tube, said element having also means engageable with an overhead electric conductor for removably supporting said electric device on and in electric conductive relation with such conductor, and a tubular socket element associated with said first mentioned element, which said socket element has its longitudinal axis extending at an angle to the axis of said tube and is designed to engage relatively rigidly one end of a maintenance pole in a manner to maintain a considerable divergent angle between such pole and the axis of said tube.

BENJAMIN R. HERMANN.